United States Patent [19]
Penn

[11] Patent Number: 5,540,199
[45] Date of Patent: Jul. 30, 1996

[54] RADIAL VANE ROTARY ENGINE

[76] Inventor: Jay P. Penn, 1725 Morgan La., Redondo Beach, Calif. 90278

[21] Appl. No.: 251,917

[22] Filed: Jun. 1, 1994

[51] Int. Cl.⁶ .............................. F02B 53/00; F25D 9/00
[52] U.S. Cl. .................... 123/243; 62/401; 123/215; 418/235; 418/260
[58] Field of Search .................. 123/240, 243; 418/6, 177

[56] References Cited

U.S. PATENT DOCUMENTS

| | | | |
|---|---|---|---|
| 1,923,561 | 8/1933 | Winckler | 123/240 |
| 3,540,816 | 11/1970 | Alcolea | 418/177 |
| 3,819,309 | 6/1974 | Jacobs . | |
| 4,018,191 | 4/1977 | Lloyd . | |
| 4,212,603 | 7/1980 | Smolinski . | |
| 4,230,088 | 10/1980 | Southard . | |
| 4,353,337 | 10/1982 | Rosaen . | |
| 4,401,070 | 8/1983 | McCann . | |
| 4,494,386 | 1/1985 | Edwards et al. . | |
| 5,049,052 | 9/1991 | Aihara . | |
| 5,277,158 | 1/1994 | Pangman . | |
| 5,302,096 | 4/1994 | Cavalleri . | |

FOREIGN PATENT DOCUMENTS

| 451076 | 2/1913 | France | 123/243 |
|---|---|---|---|
| 3108087 | 9/1982 | Germany | 123/240 |

Primary Examiner—Michael Koczo

[57] ABSTRACT

A radial vane rotary engine comprises an outer housing having a inner cam surface, and an inner housing disposed within the outer housing and having a outer cam surface. There is a substantially constant radial distance between the inner and outer cam surfaces. A rotatable rotor is disposed between the inner and outer housings. The rotor is generally cylindrical having an outer surface, an inner surface, a plurality of axial slots opening between the outer and inner surfaces, and an output shaft extending axially from an end portion of the rotor. A plurality of vanes extend radially through the slots between the inner and outer cam surfaces, providing a plurality of outer chambers between the adjacent vanes, the inner cam surface and the outer surface of the rotor. Similarly, a plurality of inner chambers are provided between the adjacent vanes, the inner cam surface and the inner surface of the rotor. The inner and outer cam surfaces are shaped to produce intake, compression, expansion and exhaust states within the inner and outer chambers during a single rotation of the output shaft. The radial vane rotary engine can be adapted to provide bottoming cycle operation to increase fuel efficiency of conventional engines, heat pump operation to replace environmentally damaging refrigerants, air compressor and/or expander operation, and turbocharger operation to increase engine efficiency and power.

14 Claims, 9 Drawing Sheets

FIG. 8A
SIDE A

FIG. 8B
SIDE B

FIG. 9A
SIDE A

FIG. 9B
SIDE B

RADIAL VANE ROTARY ENGINE

BACKGROUND OF THE INVENTION

1. Field of the Invention

This invention relates generally to rotary engines, and more particularly, to a rotary engine having vanes which are radially slidable through a rotor.

2. Description of the Related Art

The vast majority of automotive power plants and utility engines employ reciprocating four or two stroke spark ignition (SI) or compression ignition (CI) engines. Both two and four stroke reciprocating engines suffer from a low working gas displacement to physical engine displacement (size and weight) ratio, high inertia loads, and require complex mechanical arrangements. These complex arrangements include reciprocating pistons, crankshafts, cam shafts, and high speed valve trains. New two stroke reciprocating automotive engine designs are being explored as potential means to increase the power/weight and power/volume densities by as much as a factor of two. Even this two stroke approach, having simultaneous intake and exhaust processes, presents a severe challenge in producing a clean-burning engine.

The Wankel engine is the only mass production rotary engine. This engine provides a slightly better (by up to a factor of two) horsepower/volume and horsepower/weight ratio than reciprocating engines. However, the Wankel engine is similar to other prior art two or four stroke engines in terms of design complexity and suffers from relatively poor fuel efficiency due primarily to poor fuel mixing and combustion. These characteristics result in the Wankel being preferable to conventional reciprocating engines in only very limited applications.

Recently, axial vane rotary engines have been explored. Such engines employ a plurality of axially slidable vanes on a rotor which are circumferentially spaced apart. The vanes reciprocate back and forth as the rotor rotates, by cooperation with a cam surface disposed on each side of the rotor. When the vanes slide towards the rotor on one side thereof, the space between the rotor and the motor housing decreases, thus compressing the gas. Examples of axial vane rotary engines are disclosed in U.S. Pat. No. 4,401,070 to McCann, and U.S. Pat. No. 3,819,309 to Jacobs.

Axial vane rotary engines yield an increase in power/weight and power/volume ratios over either Wankel or reciprocating engines due to their high ratio of internal displacement volume to external volume and reduced weight. In addition, axial vane rotary engines are expected to yield smoother operation than prior art designs due to their many (typically twelve) chambers and power strokes on each revolution. Such engines should also result in reduced nitrous oxide emissions due to their ability to rapidly quench combustion gases. These improvements in conjunction with their inherently simplified manufacturing represent a substantial improvement over prior art engines.

Notwithstanding these expected benefits, axial vane rotary engines have several drawbacks. The axially displaced vanes experience large loads along multiple sliding surfaces. Centripetal forces produce high loads along the exterior periphery, while cam acceleration forces result in large forces along the upper and lower cam surfaces. These load paths lead to larger friction and sealing problems than if the loads all originated from a single direction. In addition, since these forces increase in magnitude in both directions with engine scale, it is difficult to scale the engine. The centripetal loads limit the radius and speed of the engine, whereas the axial acceleration forces limit the axial dimensions of the engine. As a result, multiple stacks of rotor modules are typically required to provide large displacement engines. The load problem is partially offset by stacking rotor modules, but this yields a more complex design. Another problem with axial vane rotary designs is similar to that experienced with the Wankel design, that of engine thermal fatigue due to localized hot spots where combustion occurs.

While the high horsepower/weight and horsepower/volume characteristics of the axial rotary engine will allow high output engines, such engines must be highly throttled for off-peak demand. This compromises fuel efficiency if conventional throttling techniques are employed or alternatively requires more complex transmissions to reduce engine speed during off-peak use and subsequent engine power output. The transmission approach, however, may lead to poor throttle response when required. Moreover, the axial vane engine does not provide a way to control engine displacement to tailor the engine's effective size to the required power demand.

These designs are further limited in efficiency since they provide only a topping cycle operation and do not provide a way to recover exhaust heat by utilizing a bottoming thermodynamic cycle in the same engine. As a result of these and other deficiencies, none of the above conventional engines (reciprocating, Wankel, or axial vane rotary) provide better fuel efficiency than only about 25% mechanical (shaft) power out/heat in for spark ignition and 35% for compression ignition engines.

SUMMARY OF THE INVENTION

Accordingly, it is an object of this invention to provide an improved engine which is simpler in construction and gives a significantly higher power to weight ratio than prior art piston and rotary engines.

It is another object of this invention to provide an engine with enhanced combustion characteristics leading to reduced exhaust pollution.

It is a further object of this invention to greatly improve fuel efficiency via conversion of a portion of the engine displacement to bottoming cycle operation during non-peak load engine operation.

It is a further object of this invention to provide wide throttling range effective control of engine displacement, permitting either elimination of the need for a transmission altogether or greatly reduce the number of gear ratios required.

It is yet another object of this invention to improve the scalability of rotary engines compared to prior art designs.

In accordance with these objects, this invention provides a radial vane rotary engine comprising an outer housing having an inner cam surface, and an inner housing disposed within the outer housing and having a outer cam surface. There is a substantially constant radial distance between the inner and outer cam surfaces. A rotatable rotor is disposed between the inner and outer housings. The rotor is generally cylindrical having an outer surface, an inner surface, a plurality of axial slots opening between the outer and inner surfaces, and an output shaft extending axially from an end portion of the rotor. A plurality of vanes extend radially through respective slots between the inner and outer cam surfaces, providing a plurality of outer chambers between the adjacent vanes, the inner cam surface and the outer surface of the rotor. Similarly, a plurality of inner chambers are provided between the adjacent vanes, the inner cam surface and the inner surface of the rotor. The inner and outer cam surfaces are shaped to produce intake, compression, expansion and exhaust states within the inner and outer chambers during a single rotation of the output shaft.

In this arrangement, all four strokes associated with a four-stroke piston engine occur during a single revolution of the rotor. A six-vane embodiment provides six inner and six outer chambers, permitting twelve (12) power strokes per revolution with each power stroke spaced 30° apart, thus providing the smoothness of a 24 cylinder, four-stroke piston engine operating at the same engine speed. A minimum of two sets of intake and exhaust ducts are required to support both the interior and exterior chambers. These two sets of ducts, however, can be disposed in communication with each other to allow a single engine intake and a single engine exhaust stream.

Alternative embodiments of the radial vane rotary engine incorporate performance enhancing improvements that would not be practical to implement in prior art SI and CI engines. These embodiments include the use of: (1) rolling elements disposed along a single load bearing surface either internal or external to the displacement volume to reduce friction effects of the vanes; (2) displacement control valves disposed in the rotor to vary chamber displacement; (3) variable porting and flow control valves to alternate compression/power and intake/exhaust sides of the engine; (4) flow control devices and/or porting to achieve both topping and bottoming cycle thermodynamic processes on the same fluid and same engine during off-peak power demand.

The unique configuration of the radial vane rotary engine of the present invention permits heretofore unpractical uses for internal combustion engines. For example, a portion of the engine's displacement could be convertible between topping and bottoming cycle operation. This allows extraction of useful work out of ordinary spark ignition (SI) or compression ignition (CI) engine waste heat during periods of off-peak load demand. Additionally, this allows a wide range of effective displacement control techniques, and either elimination of a transmission altogether or significant reduction of the number of gear ratios. Alternatively, this engine can operate as a positive displacement compression and/or expansion device. The engine can be used as a bottoming cycle engine in continuous operation, such as a heat pump, or as a positive displacement turbocharger. Bottoming cycle operation would increase overall engine efficiency by almost a factor of two, thereby nearly doubling the automotive power generation fuel efficiency.

A more complete understanding of the radial vane rotary engine will be afforded to those skilled in the art, as well as a realization of additional advantages and objects thereof, by consideration of the following detailed description of the preferred embodiment. Reference will be made to the appended sheets of drawings which will be first described briefly.

DETAILED DESCRIPTION OF THE PREFERRED EMBODIMENT

This invention provides an improved engine which is simpler in construction and gives a significantly higher power to weight ratio than prior art piston and rotary engines. The engine achieves enhanced combustion characteristics leading to reduced exhaust pollution. By conversion of a portion of the engine displacement to bottoming cycle operation during non-peak load engine operation, the engine achieves greatly improved fuel efficiency over conventional engines. The engine further provides wide throttling range and effective control of engine displacement, permitting either elimination of the need for a transmission altogether or greatly reduce the number of gear ratios required.

Referring first to FIGS. 1-4, a radial vane rotary engine is illustrated. The engine has an inner housing 1, an outer housing 2, a central rotor 3 mounted to an output shaft 4, and radially slidable vanes 5. Both the inner surface of the outer housing 2 and the outer surface of the inner housing 1 comprise alternating large and small radius dimensions generally alternating every 90° rotationally compared to a centerline of the engine. Thus, two alternating large and small radius cam surfaces occur in a single revolution about the centerline. The rate of change in radius of this surface per degree of revolution can be tailored to control the rate of compression or expansion of the engine gasses per degree of shaft rotation and to adjust overall compression and expansion ratios.

Figures 1, 2, 3:
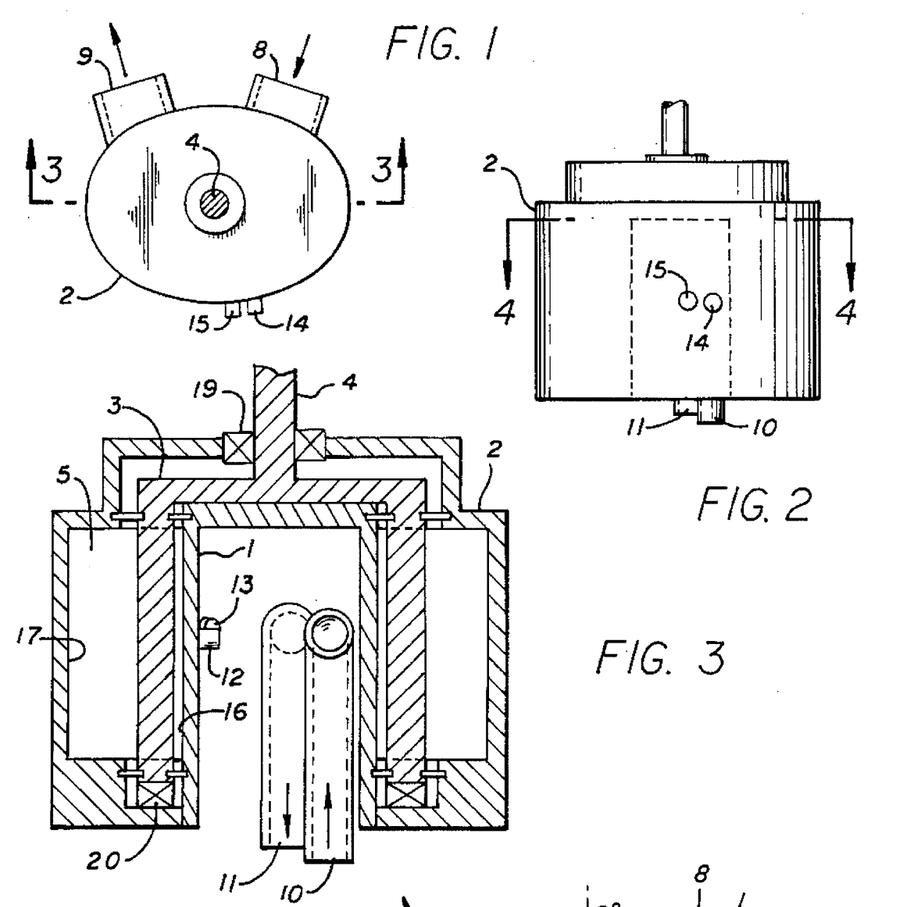
FIG. 1 illustrates a top view of a radial vane rotary engine of the present invention.
FIG. 2 illustrates a side view of the engine.
FIG. 3 illustrates a sectional side view of the engine, as taken through the section 3—3 of FIG. 1.

The rotor 3 is generically cylindrical having a hollow interior and is rotatably mounted within the inner surface of the exterior housing 2. The rotor 3 is concentrically mounted to at least one circular end plate. The end plate is also concentrically mounted to the output shaft 4. As illustrated in FIG. 3, circular grooves disposed in the upper and lower portion of the inner and outer housing surfaces combined with bearings 19 and 20 provide sealed tracks for the rotor to follow during rotation.

The inner housing 1 is contained within the rotor 3. The surface of the inner housing 1 facing the rotor 3 provides the inner cam surface on which the vanes 5 ride. In a moderate compression ratio embodiment, the alternating large and small radius geometry generally define an elliptical shape. For exemplary purposes only, the shape of the varying radius outer cam surface will herein be referred to as an ellipse. The volume enclosed between inner and outer cam surfaces is, therefore, generally an elliptically shaped tunnel having a generally rectangular cross section. The dimensions of the vanes 5 are set to match the dimensions of the cross sections. The distance between the inner and outer cam surfaces are approximately equal to the width of the vanes 5, whereas the distance between the sides is approximately equal to the length of the vanes.

A plurality of evenly angularly spaced, radially extending slots are formed in the rotor 3. Each of the radially slidable vanes 5 are sealingly received in each slot such that it can translate through the slots. The embodiment of FIGS. 1–4 illustrates the use of six vanes 5, providing six outer chambers 6 and six inner chambers 7. It should be apparent to those skilled in the art that any number of vanes 5 could be effectively utilized to provide a like number of inner and outer chambers.

Each of the vanes 5 sealingly engage the inner and outer cam surfaces, as well as both sides of the engine cavity formed by the exterior housing 2. This arrangement forms fluid receiving and pressurized spaces between adjacent vanes 5. Using a six vane arrangement, six chambers are formed between the outermost surface of the rotor 3 and the outer cam surface. An additional six chambers are formed between the innermost rotor surfaces and the inner cam surface. The latter six chamber volumes are greatest when the former six are smaller and vice-versa.

The vanes 5 extend farther from the rotor 3 during the large radius cam portions than during the small cam portions. The chambers located external to the rotor 3 are thus largest when the vanes 5 are at the large radius portions of the housing. As the rotor 3 continues to rotate in the direction of the smaller radius section of the outer cam surface, the volume of the chamber is reduced, thus compressing gasses trapped within the chamber. A similar chamber located 180° opposed is allowed, via the exhaust port suitably located, to expel exhaust gases from the engine, i.e., the exhaust stroke. Similarly, intake and expansion strokes occur as the rotor 3 rotates in the direction of the larger radius outer cam surface. The intake side of the engine includes a properly positioned intake port, while the expansion side, located 180° opposed, is closed to the environment.

To provide fuel to and from the chambers, the engine further comprises an outer chamber intake port 8, an outer chamber exhaust port 9, an inner chamber intake port 10, and an inner chamber exhaust port 11. Similarly, an outer chamber fuel injection device 15 and inner chamber fuel injection device 13 control entry of fuel into the respective chambers. Ignition of the fuel within the chambers is provided by an outer chamber spark device 14 and an inner chamber spark device 12. Spark plugs or glow plugs can be utilized as the spark devices dependent on whether spark or compression ignition engine operation is desired. Similar to prior art designs, spark ignition versions of the radial vane rotary engine ignite the compressed gas via a spark source and also possibly fuel injection located near the point of minimum volume, herein called Top Dead Center (TDC). In compression ignition designs, combustion is initiated directly as a result of fuel introduction near TDC.

The geometry of the interior and exterior cam surfaces can be tailored to match the combustion characteristics of the fuel being employed. This tailoring enables better control of the compression and expansion ratio per degree of rotor movement and also of overall compression and expansion ratios. Inlet and exhaust ports as well as spark devices and fuel injectors are located to optimize performance in a given application.

A lean air/fuel mixture or pure air enters the engine through intake ports 8 and 10. As the rotor 3 rotates (shown clockwise), the vanes 5 sealingly rub against the inner cam surface 16 and outer cam surface 17, as well as the non-cammed (flat) upper and lower housing surfaces 2. When the trailing vane 5 seals off the intake ports, the fuel mixture becomes trapped in the volume between two adjacent vanes. Since the approximate radial distance between the inner cam surface 16 and outer cam surface 17 is constant, this seal is maintained throughout the rotation of the rotor 3.

As the rotor 3 continues its rotation, the chamber volume continues to decrease in size until it reaches the smallest magnitude at approximately 180° from the intake port. This is equivalent to Top Dead Center (TDC) in a conventional piston engine. In engines employing port injection designs, fuel is injected just prior to TDC (typically 0°–30°). In a CI engine this initiates combustion, while in a SI engine this causes a rich stratified charge area. In the SI engine, spark plugs 12 and 14 fire to ignite the mixture at the proper time. The fuel injection and spark plug timing is very similar to that employed in prior art engines, particularly those of rotary design. As the mixture begins to burn and the rotor 3 continues to rotate, the distance from the rotor to the cam surfaces 16, 17 increases, allowing the combustion gases to expand and produce work on the vanes 5, thus directly pushing the rotor and output shaft 4. Unlike prior art piston and Wankel rotary engines, the cam surfaces 16, 17 can be tailored in shape to provide an optimal expansion versus engine dwell history. This provides a way to tailor the engine to adjust for specific characteristics of the fuel, thus improving on power, efficiency and pollution characteristics.

Since the radial distance between inner and outer cam surfaces remains constant, a seal between the vanes and the cam surfaces is maintained throughout the rotation of the rotor 3. As the rotor nears completion of a single rotation, a leading vane sweeps past the exhaust port and opens the port. With continued rotation of the rotor 3, the volume between the vanes 5 comes to another minimum, this time forcing the spent exhaust gases from the engine.

The configuration shown has six outer chambers and six inner chambers, each chamber firing once per revolution, thus the engine produces 12 firings per revolution. Assuming that the vane surface exposed to the combustion gases is at a maximum, this arrangement would produce the smoothness of a 24 cylinder, four-stroke engine operating at the same speed. Since the vanes 5 are partially hidden by the rotor at TDC, however, the smoothness of the rotary vane engine will actually be considerably better than that of a 24 cylinder engine of prior art design. Unlike prior art piston engines and Wankel rotary engines in which displaced volume is a small fraction of the physical size of the engine, the present invention utilizes nearly the entire physical volume of the engine as displaced volume. This, combined with two expansion and two compression cycles each revolution, a very high engine rpm range due to the rotary design, and reduced friction characteristics allowed by rolling elements to reduce vane friction, allows a major breakthrough in power/volume and power/weight over prior art designs. A factor of 20 to 40 fold improvement is possible in these two areas.

Unlike previous axial vane rotary engine designs, which have both large centripetal loads against the radial vane surface and cam induced acceleration loads along the upper and lower vane surfaces, the present radial vane rotary engine vanes are only loaded against a single direction—the centripetal direction. This allows addition of rolling vane surfaces along the centripetally loaded edge within the displacement chamber. As will be described below with respect to FIGS. 15 and 16, alternative embodiments of the engine allow the rolling surfaces to be removed from the displacement volume, thus allowing the vanes to float freely within the displacement volume.

Figure 4:
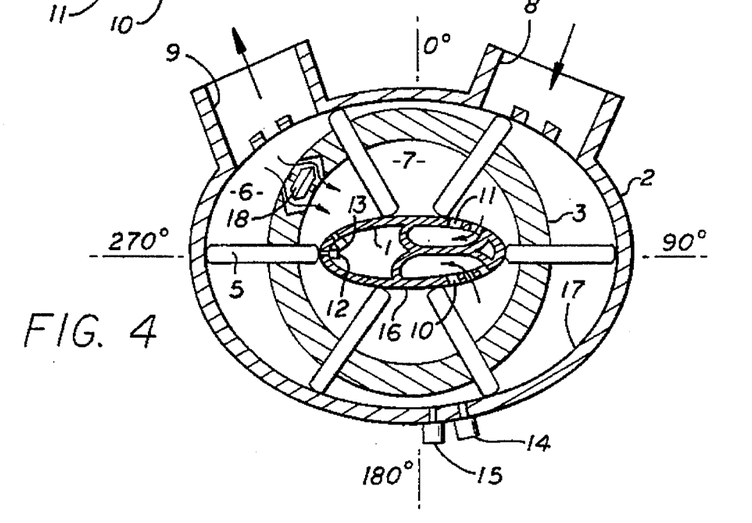
FIG. 4 illustrates a sectional top view of the engine, as taken through the section 4—4 of FIG. 2.

The engine further comprises displacement control valves 18, as illustrated in FIG. 4. The displacement control valves are located within the rotor with each valve positioned between two adjacent vanes. Each valve 18 provides displacement control for two chambers, including one inner and one outer chamber. While FIG. 4 shows a single displacement control valve 18 associated with a single pair of chambers, it should be apparent that a like valve can be disposed between each of the inner and outer chambers. In the normally closed position, the valve 18 prevents gas leakage between chambers located on opposite sides of the rotor, thus both chambers operate normally. By changing the valve 18 to the open position, the inner and outer chambers are free to communicate. Since the combined volume of the inner and outer chambers remain essentially constant, minimal compression or expansion occurs in either chamber. The fuel supply to these chambers is terminated when in this mode of operation.

This control of engine displacement allows a wide range of throttling capability and can mitigate more conventional, less efficient, throttling techniques. In addition, the rapid throttling capability provided by the relatively rapid (typically 1/10 second) cycling duration displacement control valves, could provide a way to reduce the number of transmission gear ratios required or possibly allow elimination of a transmission altogether.

This throttling is controlled by cycling the displacement control valve 18. Cycling this valve open allows the volumes between adjacent vanes both internal to and external to the rotor to be put in fluid communication. Since the sum of these two volumes remains nearly constant as the engine rotates, minimal compression or expansion occurs to the gases located on the opposite sides of the rotor between adjacent vanes. In an engine having six vanes, opening of each single valve would reduce the engine displacement by one-sixth of its full displacement. Fuel flow and spark would preferably be restricted to the remaining active volumes. A variety of hydraulic, mechanical and electrically driven actuators based on throttle demand and engine conditions can be employed to control the valve position.

Use of the displacement control valves reduces the effective engine displacement at a given rpm value, allowing an effective way to reduce the engine's air and fuel consumption and power output without leaning the mixture, reducing intake pressure (throttling) or changing engine speed. The displacement control valve can be activated by a number of conventional techniques, such as an electric motor, or hydraulic, pneumatic or electro-mechanical actuators.

Figure 5:
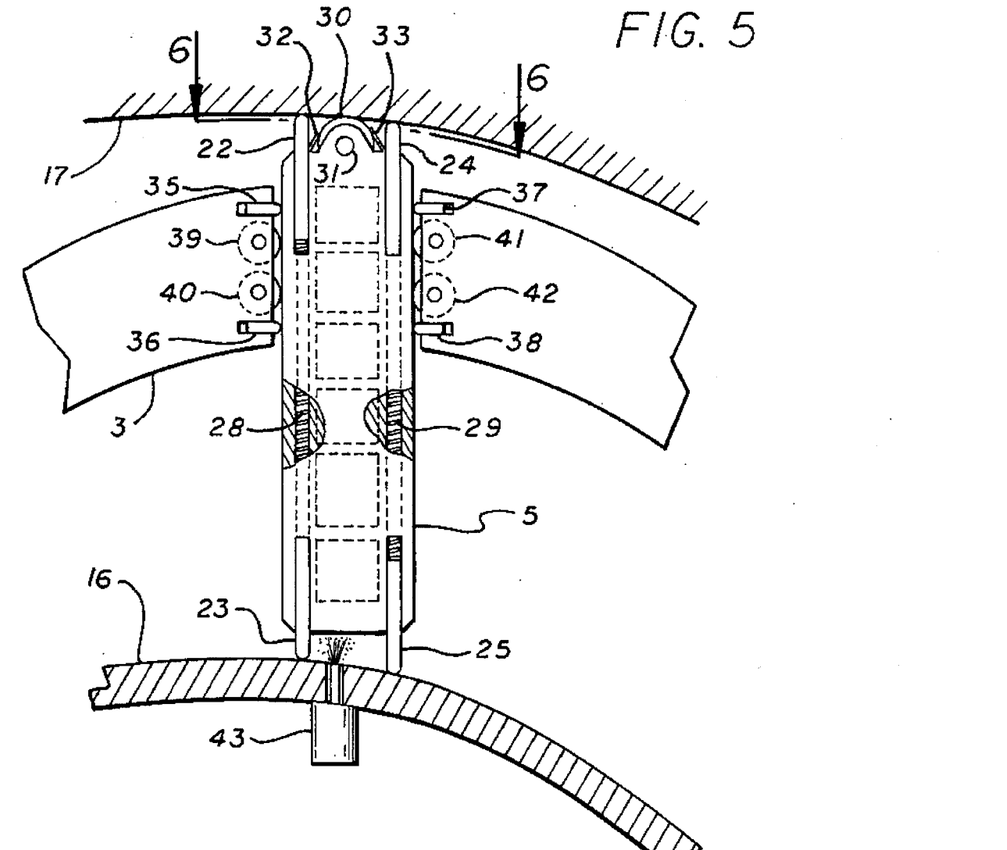
FIG. 5 illustrates an enlarged top view of an exemplary vane of the engine as in FIG. 4.
Figure 6:
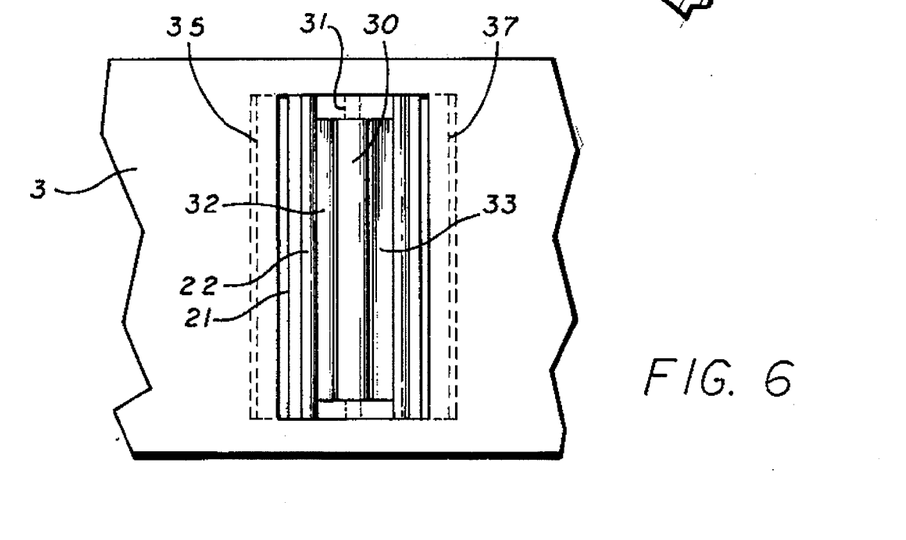
FIG. 6 illustrates an end view of the vane of FIG. 5, as taken through the section 6—6.

FIGS. 5 and 6 illustrate a preferred roller bearing and seal design for the radial sliding vane to housing seals and for the rotor to vane seals. Incorporating rolling elements along a single load bearing surface reduces friction and allows increased engine operating speeds, resulting in increased engine power density. Such a radial vane engine design should provide 20–40 times normal automotive power/weight and power/volume ratios.

Rolling elements are employed along the centrifugally loaded surface located along the outermost (with regard to the engine center line) edge of the vane 5. Unlike axial rotary engine designs, the present invention allows both centripetal and cam acceleration forces to be located along a single surface. This permits a single roller (per vane) to significantly reduce engine friction. In a similar fashion, rolling elements may be located in the rotor, such that one or more rollers are located on both sides of each vane. This may significantly reduce the potential for the vane to bind against the rotor as well as reduce friction.

Vane 5 houses four floating seals 22, 23, 24 and 25. These seals ride against the outer cam surface 16 and inner cam surface 17 and are designed to minimize both oil leakage to the compression volume and to minimize gas leakage from one compression volume to another. Seals 22 and 23 communicate forces via a spring 28. Similarly, seals 24 and 25 communicate forces via a spring 29. Roller 30 and roller pin 31 are designed to accept both centripetal and cam induced forces. Flexible wipers 32 and 33 both minimize leakage across the roller well and help to distribute oil into a thin film to lubricate the roller.

A roller bearing/seal design (similar to that just described for the vanes) is also employed on rotor 3. Seals 35, 36, 37 and 38 prevent leakage from the inner to outer compression space and vice versa. The preferred embodiment employs two rollers 39 through 42 for each side of the vane. This arrangement both maintains vane orientation and prevents vane binding. The spaces between the rotor seals on both sides of vane are permitted to communicate via ports in the rotor. This communication path minimizes pressure differential across vanes in the rotor as well as side loads and binding forces.

Optional oil injector(s) 43 mounted to the inner housing are designed to inject oil when each vane sweeps by the injector. The injector timing is established such that the majority of oil is injected between the seals 23 and 25 of each vane. Oil passages in the vanes combined with centripetal force distribute oil to the opposite side of the vane 5. This lubricates roller 30, roller pin 31, flexible wiper(s) 32 and 33, and seals 22 and 24. Applications requiring greater oil delivery capacity may include either optional injectors on the outer housing, oil injectors located within the vanes, or simply direct oil injection into the intake charge as in the Wankel engine.

In the preferred embodiment, seals 35, 36, 37 and 38 and rollers 39, 40, 41 and 42 are lubricated via oil passages in the rotor which have exits centered between seals 35 and 36 and also between 37 and 38. Rotor cooling is provided by oil circulation passages (not shown) within the rotor. The output shaft to housing interface includes rotary seals (not shown) to allow oil to enter and exit the rotor without undesirable leakage.

Such an improvement contributes to allowing higher rotational speeds, thus increased power output. In addition, the engine allows virtually unlimited scale in the axial direction, without compromising engine speed. Prior art axial rotary engines have scaling limitations due to increasing loads in both axial and radial directions as scale is increased. As a result, prior art designs for large power output must stack rows of rotors and vanes to achieve high power levels.

Figure 7:
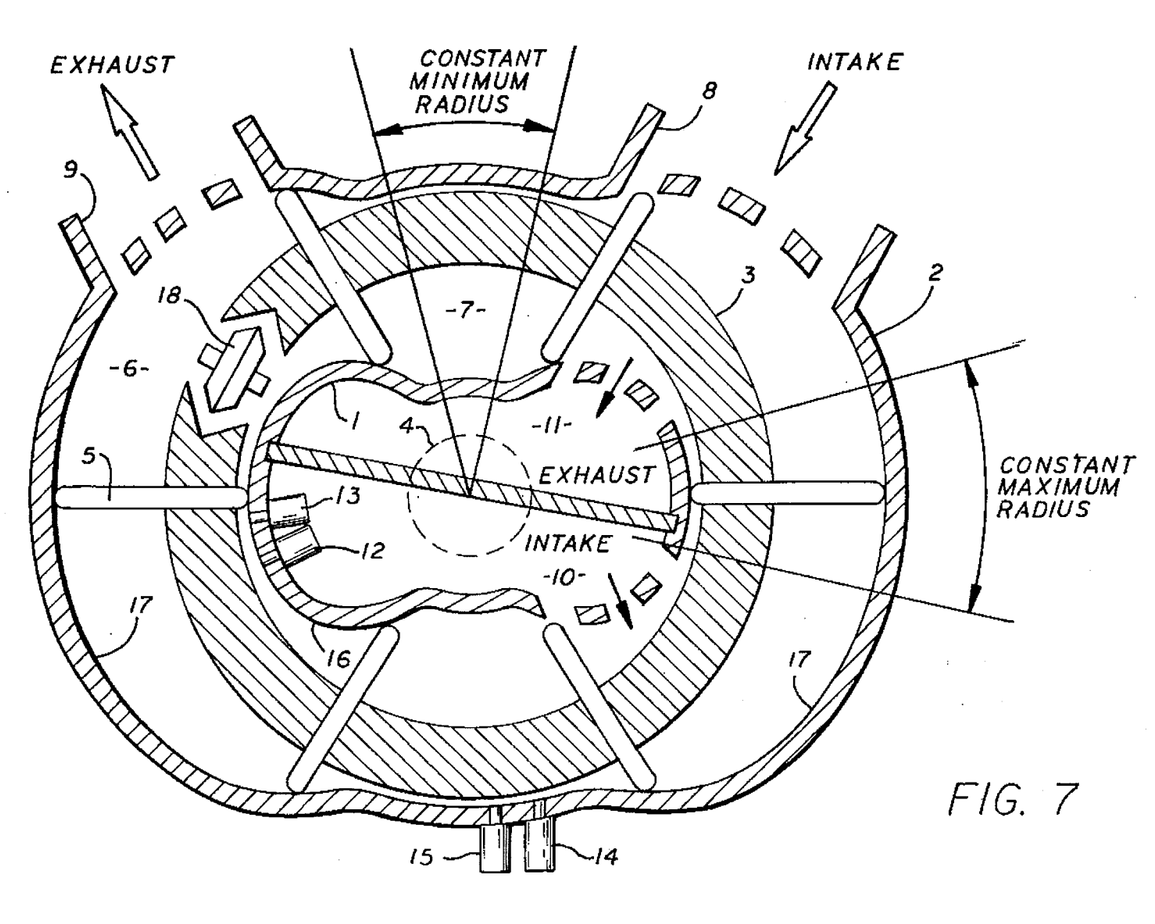
FIG. 7 illustrates an alternative embodiment of the engine of FIG. 4.

FIG. 7 shows a modified version of the embodiment shown in FIGS. 1–4. The transition radius changes rapidly between the large radius and small radius portions, unlike the gradual transitions of the previous embodiment. This achieves higher compression ratios and higher cam induced forces than the baseline design by virtue of its shape. Compression ratios lower than that achievable with the design in FIG. 7, but higher than in FIGS. 1–4 can be achieved by tailoring the design to have more gradual transitions from small to large and vice versa.

In this embodiment, the outer cam surface 17 maintains (in two locations) a constant and maximum separation distance between the central rotor and the outer cam surface. In applications in which compression ratio is to be maximized, such as a CI engine, this maximum separation areas extend over an arc of 360°/number of vanes employed (six in the preferred embodiment). These arcs are centered about each of the two positions which produce Bottom Dead Center (BDC) or maximum displaced volume. The outer cam surface 17 also maintains, in two locations a constant minimum separation between the central rotor 3 and the outer cam surface 17. This minimum separation area extends over the same length arc of 360°/number of vanes employed. Each arc is centered about each of the two positions which provide Top Dead Center (TDC) or minimum displacement volume. This area is centered 90° from TDC. A gradual transition occurs between the minimum and maximum separation arc sections. This transition is designed to control (minimize) cam forces and to control rate of compression and/or rate of expansion. As the requirement for high compression ratios is diminished, as in SI engines, the length of the constant minimum and maximum radius arcs are reduced, thus allowing a smoother, lower force transition between maximum and minimum volumes.

Figure 8A:
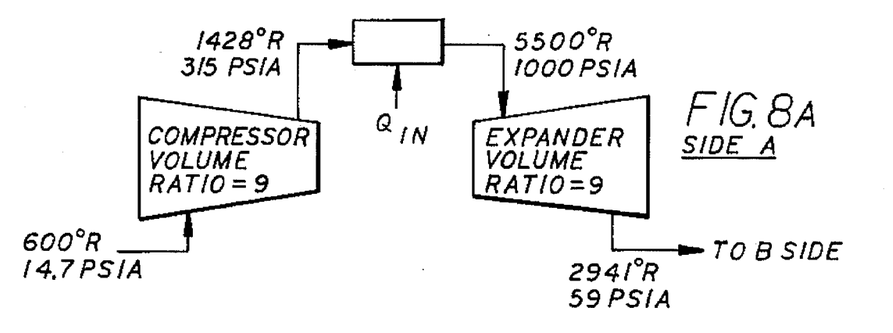
FIG. 8A illustrates in schematic form a thermodynamic cycle of a topping cycle of the engine in a high efficiency/low power output operating mode.
Figure 8B:
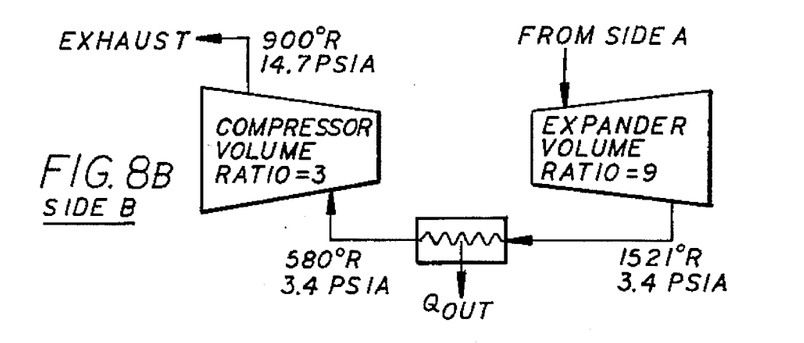
FIG. 8B illustrates in schematic form a thermodynamic cycle of a topping cycle of the engine in a high efficiency/low power output operating mode.
Figure 9A:
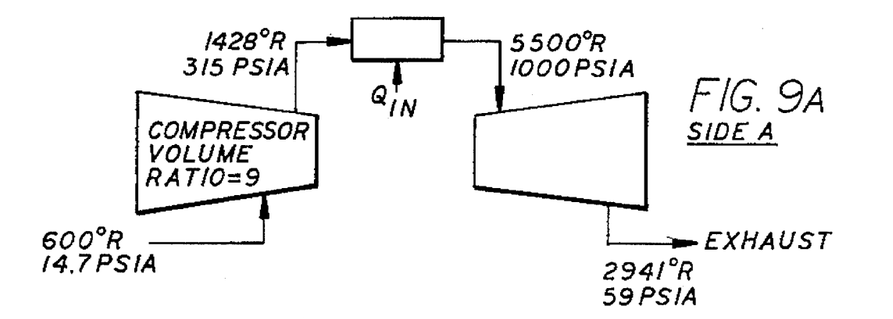
FIG. 9A illustrates in schematic form a thermodynamic cycle of a topping cycle of the engine in a normal efficiency/high output operating mode.
Figure 9B:
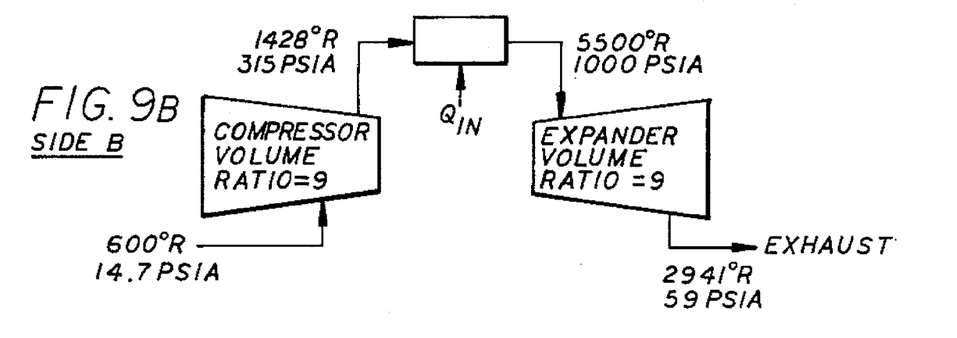
FIG. 9B illustrates in schematic form a thermodynamic cycle of a bottoming cycle of the engine in a normal efficiency/high output operating mode.

FIGS. 8–9 show the thermodynamic cycle(s) employed in an embodiment of the engine designed to achieve extremely high fuel efficiency during off-peak demand, and lower (conventional spark ignition or compression ignition) efficiencies during peak power demand. FIGS. 8A and 8B show the thermodynamic processes employed in the engine to provide the high efficiency/low power output mode. FIGS. 9A and 9B illustrate the thermodynamic processes employed in the engine to provide the high output, normal efficiency operating mode.

In these embodiments, the engine contains two displacement sides. Engine side A always operates in topping cycle mode as a conventional spark (or compression) ignition engine. Engine side B operates as a bottoming cycle during the high efficiency/low power output mode as shown in FIGS. 8A and 8B, and as a topping cycle during the high output, normal efficiency mode as shown in FIGS. 9A and 9B. If side B is sized such that while operating in the bottoming cycle mode, it can accommodate the same mass flow as side A, it would be sized to have approximately the displacement of side A. As shown in the example size engine of FIG. 8, engine side A produces 25.3 hp output at a realizable efficiency (after friction, heat and real cycle losses) of about 25% for a typical spark ignition engine.

In bottoming cycle operation, side B utilizes exhaust gases from side A as the input to side B. Here, the side A exhaust gases are further expanded to even lower pressures (less than atmospheric), intercooled to near ambient temperature and recompressed to ambient pressure. Since the work produced during the expansion process in side B is larger than that required by the lower temperature and lower pressure ratio compression process in side B, side B produces useful work. The bottoming cycle is enabled via variable engine inlet and exhaust porting and external flow control devices such as valving and plumbing.

Work is produced using side A exhaust heat and is equal to approximately 15.4 hp in the example shown. Since no additional heat input was required in fuel, the engine efficiency is increased by greater than 15%. The sum of sides A and B components are approximately 41 hp and 41% shaft efficiency for a spark ignition engine. The power and efficiency of a compression ignition rather than the spark ignition engine shown in FIG. 8 would normally provide even higher efficiencies and output power while operating in this mode.

FIG. 9 illustrates the thermodynamic processes employed in the engine to provide the high output power, normal efficiency-mode. In this mode, both engine sides A and B operate as conventional topping cycle engines. Both sides produce realizable efficiencies of about 25%. In the example shown, the nine times larger displacement of side B allows the side B to produce up to 227 hp at 1000 rpm. The sum of side A and side B outputs equals 253 hp at 1000 rpm.

A wide range of output power and torque can be provided simply by cycling between topping and bottoming cycle mode operation for side B and by varying the engine rotational speed. At low engine speed of 250 rpm, the engine has considerably better smoothness than a conventional six cylinder four stroke engine operating at 1000 rpm, and can produce anywhere from 10.2 hp to 63 hp. At maximum speed of 8000 rpm, the engine can produce anywhere between 325 hp and 2020 hp. It should be apparent that use of conventional throttling techniques employed in SI or CI engines will increase this power range even further.

This wide range of output power, speed and corresponding torque greatly reduces the need and/or complexity of a transmission. In many applications, a transmission can be eliminated altogether. In applications requiring a wide range of power and torque capabilities, a simple transmission with a minimum number of gear ratios may be required.

Another variation of this flow control embodiment allows elimination of separate air conditioning heat pumps in some applications. This is due to the ability of side B to function as a heat pump.

Figure 10:
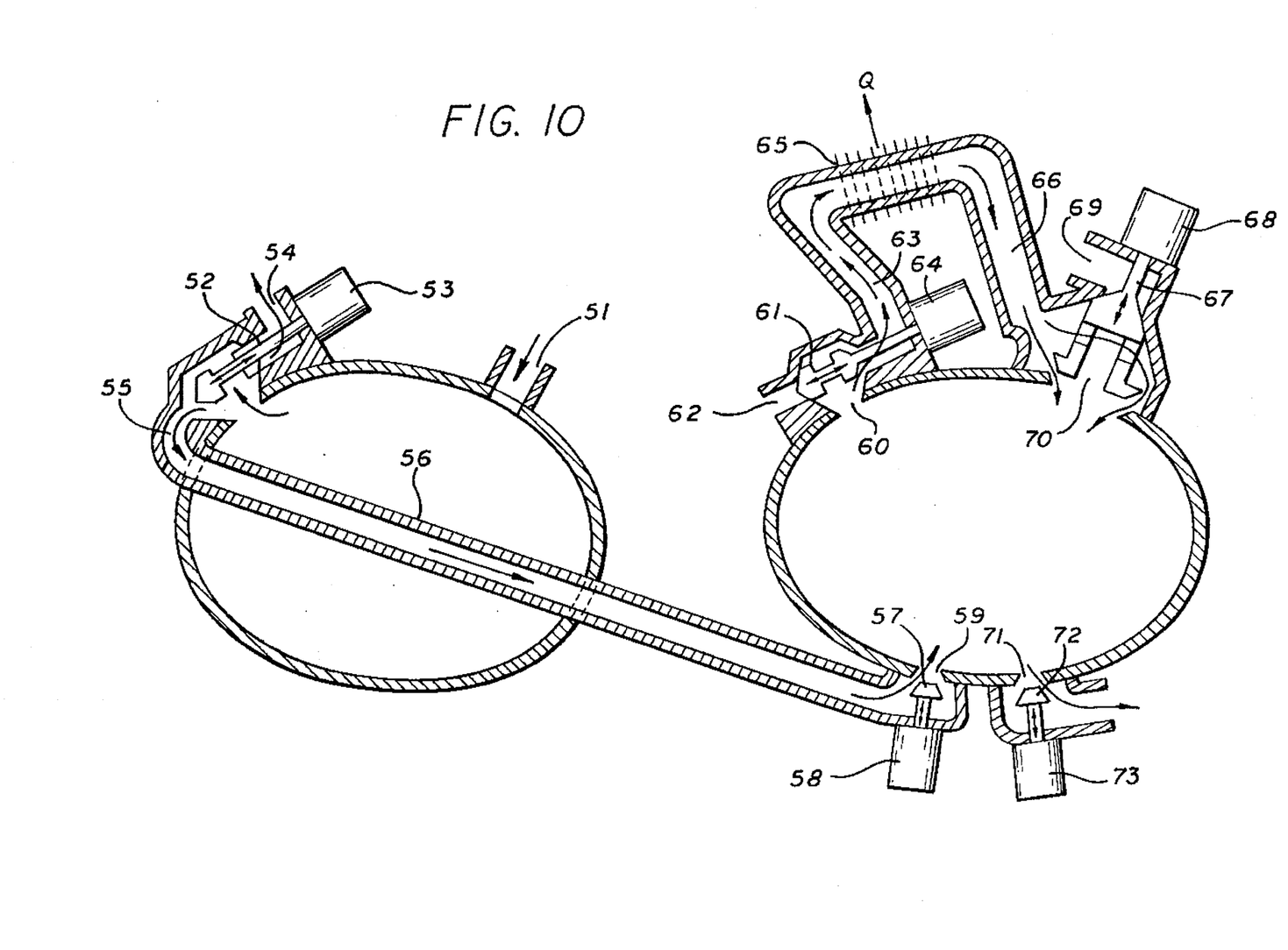
FIG. 10 illustrates an alternative embodiment of the present invention constructed in accordance with the thermodynamic cycles of FIGS. 8 and 9.

FIG. 10 shows modifications to the basic design of the engine which allow the thermodynamic processes of FIGS. 8 and 9 to be accomplished. This modification allows switching between a high efficiency/low output operating mode and the high output, normal efficiency operating mode. In embodiment of FIG. 10, engine displacement available during off-peak demand is convertible from topping cycle operations to bottoming cycle operation. It is also possible to simplify this embodiment at the compromise of power to weight by allowing side B to only operate in the bottoming cycle operation. This would allow a reduction in the quality of moveable valves used in the convertible side B. Such simplifications should be readily apparent from the foregoing to those skilled in the art.

Engine sides A and B could drive the same output shaft with each side having its own rotor and vanes. The displacement of side B is typically set at approximately nine times that of side A, such that side B can accommodate the mass exiting side A while operating in the bottoming cycle mode. The embodiment is capable of performing both in a low output/high efficiency mode as described in the thermodynamic cycles of FIG. 8, and in a high output/normal efficiency mode as described in the thermodynamic cycle of FIG. 9.

The engine achieves extremely high fuel efficiency during off peak output (power demand) by employing a bottoming cycle thermodynamic process in addition to the normally employed compression ignition (CI) or spark ignition (SI) topping cycle. This is accomplished by utilizing the excess volumetric capacity available during off-peak demand to perform the bottoming cycle operation. During peak power demand, the displacement employed for bottoming cycle operation is instead employed to perform a high power output by operating in a less efficient topping cycle operating mode. Side A is always employed as a SI or CI topping cycle. The larger side B can either be used as a topping cycle supplying power during peak demand periods or during off-peak demand can operate as a bottoming cycle utilizing the exhaust gases from side A. The lower density gases used in the bottoming cycle dictate the larger displacement by approximately a factor of nine assuming both sides are to accommodate the same mass flow. During topping cycle operation for both chambers, it becomes apparent that side B provides about nine times the power of side A alone.

A combination of variable porting, employed in side B, external flow control valves, plumbing, fuel and spark control, and a suitably configured heat exchanger allows this embodiment. During peak demand periods, both sides A and B are configured to function as normal spark ignition (SI) or compression ignition (CI) topping cycle engines. In this mode of operation, the engine produces very high output power at fuel efficiencies comparable to prior art CI or SI engines.

During the bulk of routine operation at partial throttle, the smaller side A continues to operate as a SI or CI topping cycle engine. The exhaust gates exiting side A are redirected via porting and flow control valves, such that side B begins to function in a bottoming cycle mode. This combined topping/bottoming cycle operation results in a near doubling of fuel efficiency, and a high degree of reduction in output power, i.e., throttling at a given engine speed. Relatively rapid acting control valves enable the engine to rapidly switch between operating modes.

During low output/high efficiency output mode (side B operating as a bottoming cycle) air enters side A (capable of topping cycle operation only) through intake valve 51. Exhaust valve 52 is positioned in the retracted position by a hydraulic, pneumatic, or electrical actuator 53 controlled by a signal relating to demand power output. Such an arrangement restricts side A exhaust from exiting via the topping cycle exhaust exit 54 to the atmosphere (or exhaust system). Instead the exhaust gases are directed to side A/B transfer port 55 and on to side A/B transfer tube 56. In some applications, side A/B transfer tube 56 contains a catalytic converter (not shown) in order to burn residual pollutants prior to entering side B.

Side B bottoming cycle input valve 57 is a fast acting valve, controlled by bottoming cycle input actuator 58 which rapidly cycles between open and closed. This cycling typically occurs six times per revolution. Cycling the valve open meters the exhaust gas entry into side B at the time of minimum volume, [top dead center (TDC)] through bottoming cycle input port 59. As the rotor advances, the trapped volume is fully expanded as it arrives at the location of maximum volume [bottom dead center (BDC)]. The expanded flow is permitted to exit via exhaust port 60. Exhaust recirculation valve 61 is extended, thus blocking topping cycle exhaust exit 62 and opening recirculation port 63. Side B exhaust/recirculation actuator 64 controls the position of valve 61.

Sub-atmospheric pressure gases exit recirculation port 63 and pass through intercooler 65. The near ambient temperature, low pressure gases exiting intercooler 65 re-enter side B of the engine through recirculation input port 66. Intake/recirculation valve 67 is positioned, via intake/recirculation actuator 68, in a retracted position keeping atmospheric input port 69 closed and allowing the intercooled gases to re-enter side B via air/recirculation input port 70. Intake/recirculation valve 67 is configured such that a larger air/recirculation input port 70 opening dwell occurs during low power output (bottoming cycle operation). The larger dwell permits the larger intake volume required during low power operation to be accommodated. The gases re-entering the engine at this location are compressed to atmospheric pressure as TDC position is approached. Bottoming cycle exhaust port 71 is positioned such that the gases exit the engine at approximately atmospheric pressure. Exhaust valve 72 positioned to the retracted position by exhaust valve actuator 73 allows this to occur.

The configuration described above accomplishes the thermodynamic cycle of FIG. 8, producing an output of about 41 hp and 41% efficiency at 1000 rpm. The range of output power while in this mode can vary between 10.2 hp at 250 rpm (with the smoothness of a conventional six cylinder at 1000 rpm), to 325 hp at 8000 rpm. Relatively quick acting actuators 53, 58, 64, 68 and 73 allow for a rapid reconfiguration to the high output, normal efficiency mode.

During the high output/normal efficiency mode (side A and B both operating in topping cycle mode) air enters side A through intake valve 51. Exhaust valve 52 is positioned in the extended position permitting side A exhaust gases to exit the engine through topping cycle exhaust exit 54.

Side B is configured to produce the same thermodynamic cycle as side A, but due to its larger displacement produces significantly more power. Intake/recirculation valve is extended permitting intake air to enter side B through atmospheric input port 69. By use of internal porting, the air contained within valve 67 passes through the smaller diameter (less inlet opening dwell time) inlet to the engine. Valves 57 and 72 are both in the extended position, thus preventing gases from entering and exiting the engine at those locations. As a result of exhaust recirculation valve 61 being set to the retracted position, exhaust gases pass through exhaust port 60, and exit the engine through the topping cycle exhaust exit 62.

The configuration described above accomplishes the thermodynamic cycle of FIG. 9, producing a combined A and B side output of 253 hp and about 25% efficiency at 1000 rpm. A wide range of power outputs while operating in this mode can be achieved. This range is from 62 hp at 250 rpm to 2020 hp at 8000 rpm. Relatively rapid, typically less than 1/10th second response, actuators 53, 58, 64, 68 and 73 allow for a rapid reconfiguration between the high output/normal efficiency mode and the low output efficiency mode of operation. The ability to rapidly cycle between operating modes allows the engine a wide range of power outputs. At 1000 rpm, for example, the output power can range from 41 to 253 hp without the need for conventional, inefficient, throttling technique. By varying engine speed between 250 and 8000 rpm, the engine can produce a range of 10 to 2020 horsepower. Combining mode switching with conventional spark or compression ignition throttling techniques can further extend the range of power output. The mode cycling and throttle setting would preferably be controlled as a function of throttle position as well as other relevant driving conditions. This large variation of output power and torque allows either elimination of the requirement for a transmission altogether or allows a transmission with a minimal number of gear ratios to satisfy automotive requirements.

Figure 11:
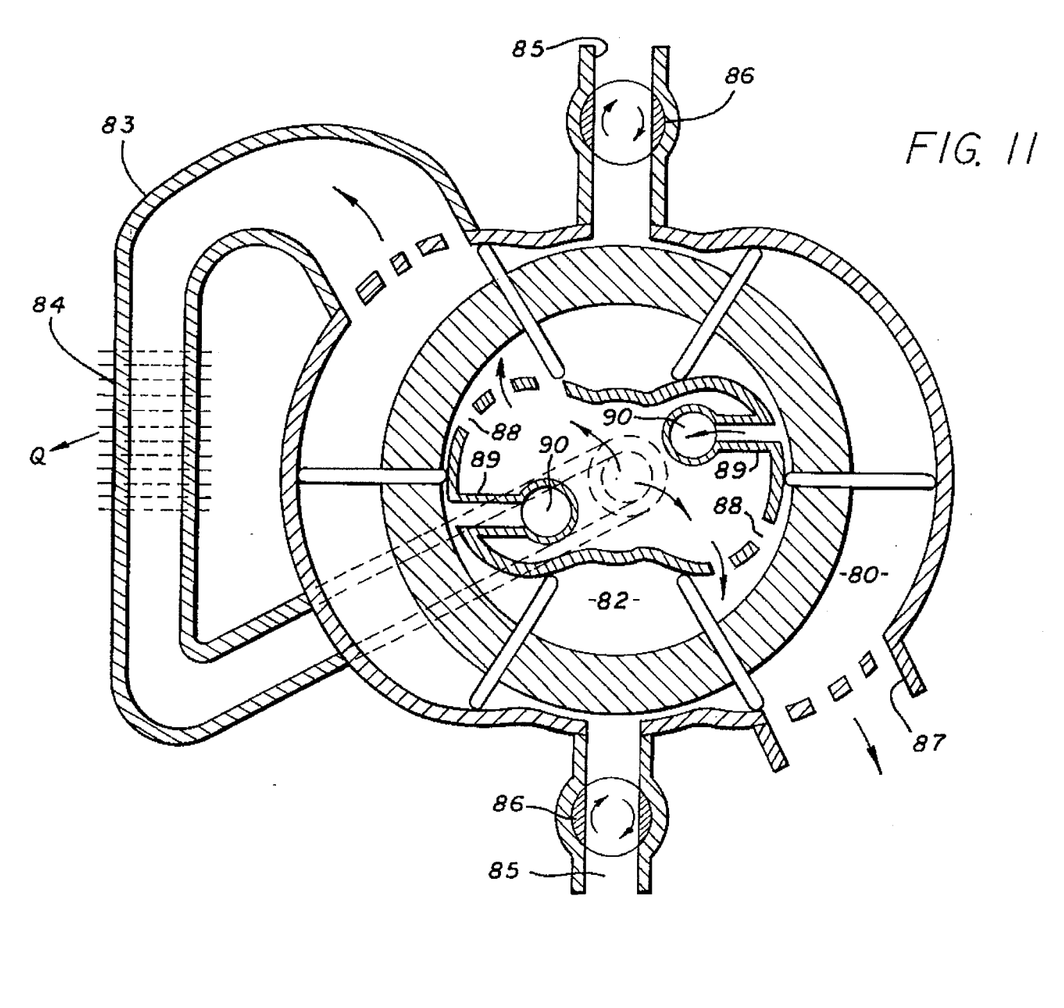
FIG. 11 illustrates an alternative embodiment of the present invention in which the engine functions as a compressor and an expander.

Although it would be possible to modify prior art piston engines to accomplish mode switching between bottoming and topping cycle operation as shown in FIG. 11, the valving, porting and timing arrangements in a piston engine would be significantly more complex, thus would lead to higher costs and reduced reliability. However, the mode switching embodiment shown in FIG. 11 is useful as an improvement to Wankel type and axial vane rotary engine designs.

The large power/weight capability of the present invention, dictates a requirement for more effective throttling in many applications. This can be provided by the mode switching embodiment. In addition, the excess capacity available during off-peak operation allows a portion of the engines displacement to be used for bottoming cycle operation.

FIG. 11 illustrates a modified version of the engine designed to function both as a compressor and an expander allowing isolation between the compression and expansion fluids. The outer chambers 81 are utilized for expansion whereas the inner chambers 82 are utilized for compression of the fluid(s). It is shown with supporting apparatus transfer tube 83 and heat exchanger 84 allowing this unit to function as a continuous bottoming cycle augmentation unit to a reciprocating or rotary CI or SI engine. In this expansion and compression arrangement, to allow bottoming cycle operation the exhaust stream from a CI or SI engine enters the unit via exhaust flow inlet 85. Rotational, as shown, (or conventional) poppet valve 86 controlled via shaft position regulates flow into the outer chambers 81. Ports 87 allow the expanded fluids to exit the device. When used as a bottoming cycle engine, this expanded fluid passes via transfer tube 83 through heat exchanger 84. This flow re-enters the engine via inner chamber inlets 88. The compressed flow exits the engine via compressed exhaust outlet 89. Check valve 90 restricts the compressed fluid from re-entering the engine. Both ports 87 and transfer tube 83 are in fluid contact via plumbing.

This arrangement allows the engine to perform the bottoming cycle operation described in FIG. 8. This embodiment lends itself to straight forward variations, including use of this device with modified plumbing to function as a heat pump (air conditioner or heater).

Employed as a heat pump, in which the fluid is first compressed then expanded, the intake fluid (typically ambient air) enters the unit via inlet 88. The compressed flow exits outlet 89 and check valve 90 prior to going to intercooler 84 (plumbing not shown). The intercooled flow re-enters at inlet 85 where it is permitted to expand. The cooled expanded fluid (preferably air) provides required cooled air. Employed as a heat pump in which the fluid is first expanded then compressed, the intake fluid, typically ambient air, passes through the device in an identical fashion to that employed when used as a bottoming cycle. The inlet fluid enters inlet 85, exits port 87 fully expanded (and cooler) where it is used as the heat sink in air conditioning heat exchanger 84. This cools the external air flowing over heat exchanger 84 which is to be air conditioned. The internal fluid after passing through heat exchanger 84 and picking up heat then reenters the engine via inlets 88. Here the fluid is compressed to ambient pressure and hotter than ambient temperature where it exits the heat pump to the atmosphere (or to a heater blower if heat is to be utilized).

This heat pump is considerably more volumetrically efficient than prior art designs, allowing packaging, weight and manufacturing cost advantages. Its ability to utilize air as the refrigerant enables the device to be more environmentally acceptable than Freon or other refrigerants.

The device could also function as a positive displacement turbocharger unit. In this embodiment, the exhaust stream would enter via the exhaust inlet 85 and the expanded exhaust stream would exit to the atmosphere via exhaust outlet 87. Fresh intake air would enter the compressor via inner chamber inlet 88 and would exit via compressed exhaust outlet 89. In applications requiring very high compression ratios, optional check valve 90 would restrict the compressed fluid from re-entering the turbocharger unit. The compressed fresh air exiting the check valve is fed to a conventional internal combustion engine. The positive displacement turbocharger, unlike prior art centrifugal turbochargers, is both effective and efficient over the entire engine speed and throttle range.

Minor design variations apparent to those skilled in the art would allow this embodiment to be used only as a compressor. In this variation, both the inner and outer chambers are used for compression or expansion. Also, dependent on volume constraints, the outer chambers can be used as a compressor and the inner as an expander. Finally, the inner and/or outer chambers can perform both compression of one fluid stream and expansion of a separate fluid stream in a single revolution of the device. These embodiments require only minor variations of the inlets, outlets and plumbing.

As shown in the above examples, the use of this invention including plumbing, flow control devices, and variable porting permits the variety of other than bottoming cycle thermodynamic cycles to be accomplished with straight-forward engineering design. One such example would be an automotive air conditioning mode employing side B of the engine of FIG. 10 as an air fluid based heat pump during off-peak operation. This arrangement eliminates the need for a separate air conditioning unit on automobiles, and for a separate refrigerant. Both the bottoming cycle and air conditioning modes of operation reduce engine temperatures and scaling requirements and thus thermal stresses compared to prior art designs.

In the engine of FIG. 10, the two flows can be separately processed. This embodiment enables the engine to be operated in applications which include either a bottoming cycle engine, a heat pump, or a positive displacement turbocharger. As a bottoming cycle engine the device uses waste heat from ordinary combustion engines as a way to improve overall engine (and fuel) efficiency.

Alternatively, this embodiment provides a highly volumetrically efficient heat pump (air conditioner) which utilizes air as a refrigerant in lieu of less environmentally friendly refrigerants. In this application the device should also reduce manufacturing costs. In a final application, this embodiment can also be used as a positive displacement turbocharger. Such a turbocharger mitigates design problems caused by prior art centrifugal turbochargers which only operate efficiently at one speed.

Overall, this embodiment should provide a major breakthrough in engine performance for a variety of applications including but not limited to automotive, aircraft, boats, co-generation, and portable power supply and utility devices, when compared to prior art rotary and piston engines. These advantages include very high power to weight and power/volume, a tremendous increase in average fuel efficiency, an ability to efficiently and cleanly burn a variety of fuels, smooth operation and rapid throttle response. In addition, this engine should be simple to manufacture and to maintain using conventional materials and processes. Furthermore, the high power, high throttling capability may allow a means to greatly simplify the current transmission or eliminate the transmission, other than the clutch, altogether. The engine can also be designed to eliminate the need for a separate air conditioning heat pump (compressor) unit.

Figure 12:
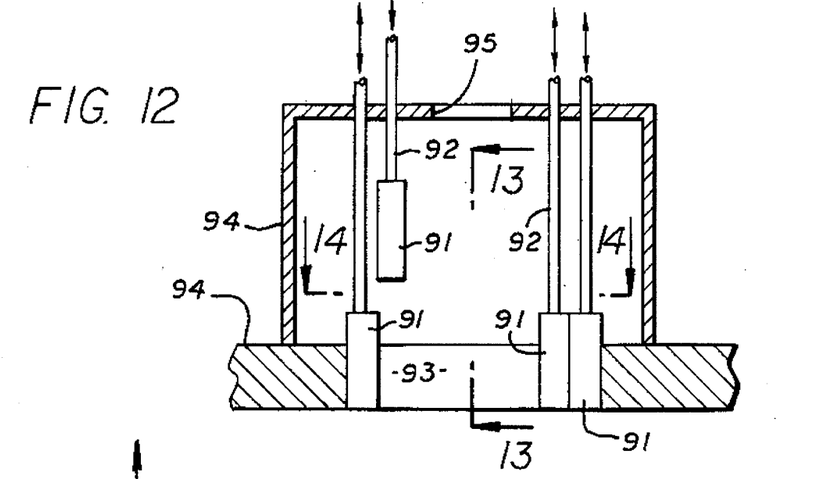
FIG. 12 illustrates an alternative embodiment of the present invention having a movable port plug providing modification of inlet and/or outlet port timing (dwell) and opening duration.
Figure 13:
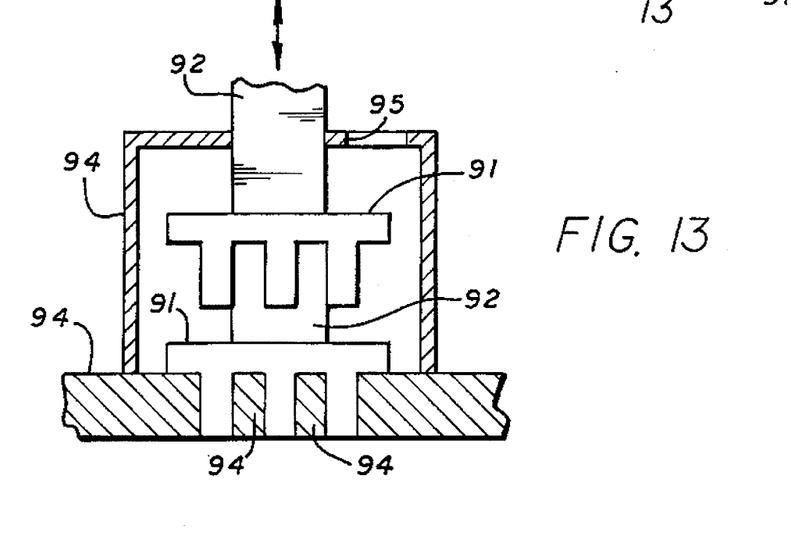
FIG. 13 illustrates the movable port plug of FIG. 12, as taken through the section 13—13.
Figure 14:
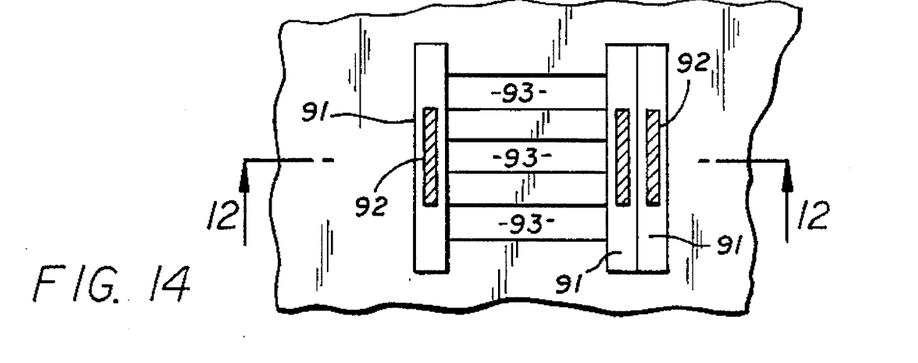
FIG. 14 illustrates the movable port plug of FIG. 12, as taken through the section 14—14.

FIGS. 12–14 illustrate a movable port plug arrangement which allows modification of inlet and/or outlet port timing (dwell) and opening duration, and/or allow alternating the locations of the high heat flux compression/power strokes and the intake/exhaust strokes. Individual or multiple plugs 91 are controlled via electro-mechanical, hydraulic, or mechanical actuators (not shown) which position port control rods 92 dependent on engine conditions and operating mode to either an open (up) or closed position (down). Port opening 93 and closing positions are established by the position of the control rods and plugs. Housing 94 contains inlet and outlet gases. Gases enter or exit via orifice 95.

Similarly, the variable porting and flow control valves shown in FIGS. 12–14 can be used to periodically alternate the locations of the high heat flux compression/power strokes and the intake/exhaust strokes. The general symmetry of the engine allows this embodiment which alternatingly opens and closes intake and exhaust ports on opposed sides of the engine. This allows alternating high and low heat flux areas of the engine, thus providing a way to mitigate the thermal stress problems in prior art rotary engine designs. Often, these prior art designs having combustion occurring in only a single location resulted in large thermal stresses, engine fatigue and eventually stress induced engine failure.

Figure 15:
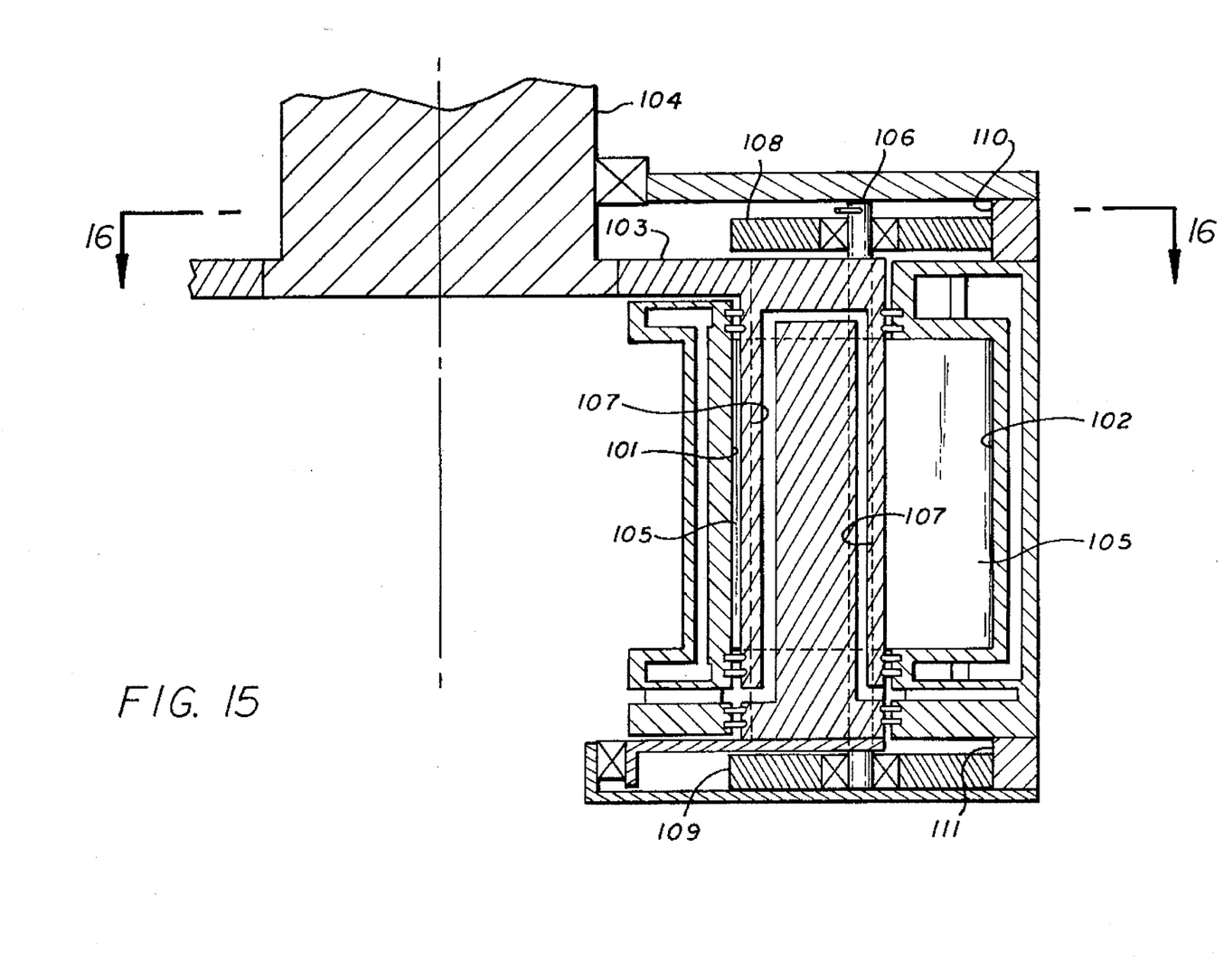
FIG. 15 illustrates a sectional side view of an alternative embodiment of the engine of FIGS. 1-4.
Figure 16:
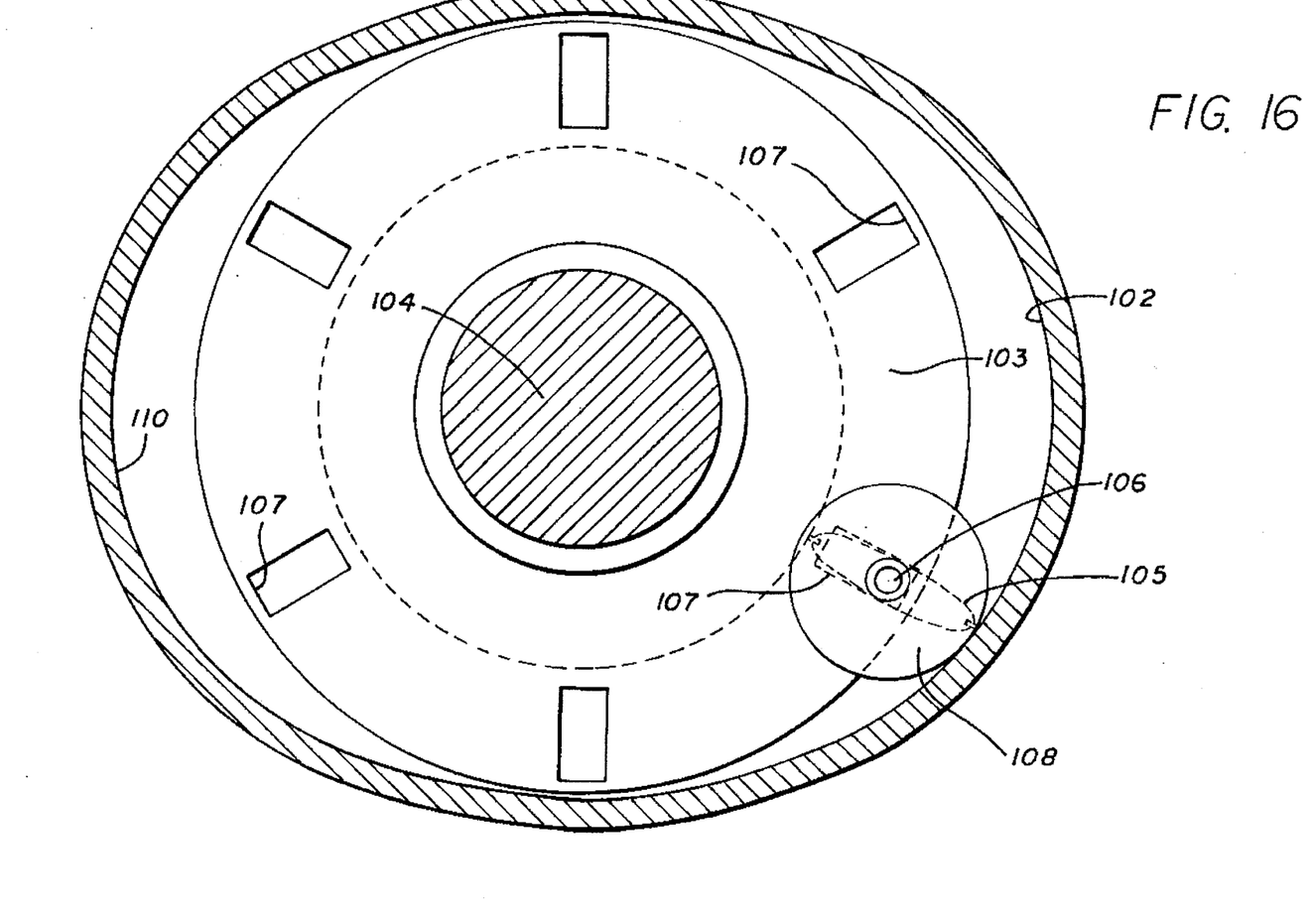
FIG. 16 illustrates a sectional top view of the alternative embodiment as taken through the section 16—16 of FIG. 15.

FIGS. 15 and 16 illustrate an alternative embodiment of the engine of FIGS. 1–4 in which the vanes are prevented from rubbing along the inner and outer cam surfaces by use of rollers mounted outside the engine's displacement volume or combustion zone. Incorporating roller bearings external to the combustion zone allows the vanes to float freely within the engine. This reduces friction and allows greatly increased engine operating speeds, resulting in increased engine power density. In addition, since the rubbing within the engine's displacement volume can be minimized or eliminated completely, the need for lubrication within the engine's displacement can be completely eliminated.

In this embodiment, vanes 105 contain a vane guide shaft 106 that passes through shaft slots 107 in rotor 103. Vane guide shaft 106, in conjunction with roller bearings 108, 109 cam guides 110, 111 control the radial displacement of the vanes. Cam guides have generally the same shape as the outer cam surface and, depending on the outer diameters of roller bearings 108, 109, can also have the same dimensions. The external roller bearings allow the vanes to float within the engine's displacement volume located between the inner housing cam surface 101 and the outer cam surface 102. Using this embodiment, designs which employ close dimensional tolerances can eliminate the use of vane seals altogether.

Having thus described a preferred embodiment of a radial vane rotary engine, it should now be apparent to those skilled in the art that certain advantages of the system have been achieved. It should also be appreciated by those skilled in the art that various modifications, adaptations, and alternative embodiments thereof may be made within the scope and spirit of the present invention. The present invention is further defined by the following claims.

What is claimed is:

1. A radial vane rotary apparatus comprising:

an outer housing having a inner cam surface;

an inner housing disposed within said outer housing and having a outer cam surface, a substantially constant radial distance being provided between the inner and outer cam surfaces;

a rotatable rotor disposed between said inner and outer housings, said rotor having an outer surface, an inner surface, a plurality of axial slots opening between said outer and inner surfaces, and an output shaft extending axially from an end portion of said rotor; and a plurality of vanes extending radially through said slots between said inner and outer cam surfaces, so that a plurality of outer chambers are provided between said adjacent vanes, said inner cam surface and said outer surface of said rotor, and a plurality of inner chambers are provided between said adjacent vanes, said outer cam surface and said inner surface of said rotor;

means for circulating a working fluid to and from said inner and outer chambers, said inner and outer cam surfaces providing intake, compression, expansion and exhaust states of said working fluid entirely within said inner and outer chambers during a single rotation of said output shaft.

2. The radial vane apparatus of claim 1, wherein said circulating means comprises outer intake and exhaust ports in said outer housing to permit fluid flow selected from the group consisting of air, fuel and air/fuel mixture into said outer chambers, and exhaust gas out of said outer chambers.

3. The radial vane apparatus of claim 1, wherein said circulating means comprises inner intake and exhaust ports in said inner housing to permit fluid flow selected from the group consisting of air, fuel and air/fuel mixture into said inner chambers, and exhaust gas out of said inner chambers.

4. The radial vane apparatus of claim 1, wherein said inner and outer cam surfaces have a generally elliptical shape.

5. The radial vane apparatus of claim 1, further comprising means for igniting fuel within said inner and outer chambers.

6. The radial vane apparatus of claim 1, further comprising rolling elements disposed on said vanes, wherein said rolling elements reduce friction between said vanes and said cam surfaces.

7. The radial vane apparatus of claim 6, wherein said rolling elements are disposed outside of said outer chamber such that said vanes are prevented from rubbing along the inner and outer cam surfaces.

8. The radial vane engine of claim 1, further comprising bearing elements disposed in said slots, wherein said bearing elements reduce friction and binding of said vanes through said slots.

9. The radial vane engine of claim 2, further comprising means for adjustment of timing of port opening and closing for said outer intake and exhaust ports.

10. The radial vane apparatus of claim 1, wherein said rotor further comprises at least one displacement control valve disposed between said inner and outer surfaces of said rotor allowing fluid communication between said inner and outer chambers.

11. The radial vane engine of claim 1, wherein one of said inner and outer chambers provides a topping cycle operation and another one of said inner and outer chambers provides a bottoming cycle operation.

12. The radial vane engine of claim 1, wherein said engine provides bottoming cycle operation for use with exhaust gas of an externally generated heat source.

13. The radial vane apparatus of claim 1, wherein there are six of said radial vanes.

14. A radial vane rotary apparatus comprising:

an outer housing having a inner cam surface;

an inner housing disposed within said outer housing and having a outer cam surface, a substantially constant radial distance being provided between the inner and outer cam surfaces;

a rotatable rotor disposed between said inner and outer housings, said rotor having an outer surface, an inner surface, a plurality of axial slots opening between said outer and inner surfaces, and a centrally disposed output shaft extending axially from an end portion of said rotor; and a plurality of vanes extending radially through said slots between said inner and outer cam surfaces, so that a plurality of outer chambers are provided between said adjacent vanes, said inner cam surface and said outer surface of said rotor, and a plurality of inner chambers are provided between said adjacent vanes, said outer cam surface and said inner surface of said rotor, said inner and outer cam surfaces providing intake, compression, expansion and exhaust states of a working fluid within said inner and outer chambers during a single rotation of said output shaft.

* * * * *